(12) United States Patent
Liang

(10) Patent No.: US 10,154,446 B2
(45) Date of Patent: Dec. 11, 2018

(54) NETWORK SWITCHING METHOD AND DEVICE

(71) Applicant: China Academy of Telecommunications Technology, Beijing (CN)

(72) Inventor: Jing Liang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 89 days.

(21) Appl. No.: 14/763,094

(22) PCT Filed: Jan. 20, 2014

(86) PCT No.: PCT/CN2014/070903
§ 371 (c)(1),
(2) Date: Jul. 23, 2015

(87) PCT Pub. No.: WO2014/114216
PCT Pub. Date: Jul. 31, 2014

(65) Prior Publication Data
US 2015/0382269 A1    Dec. 31, 2015

(30) Foreign Application Priority Data

Jan. 24, 2013   (CN) .......................... 2013 1 0027263

(51) Int. Cl.
*H04W 36/30* (2009.01)
*H04W 24/02* (2009.01)
(Continued)

(52) U.S. Cl.
CPC .......... *H04W 36/30* (2013.01); *H04B 7/0632* (2013.01); *H04M 7/006* (2013.01);
(Continued)

(58) Field of Classification Search
CPC ..... H04W 36/30; H04W 36/14; H04W 24/02; H04W 88/06; H04B 7/0632; H04M 7/006
See application file for complete search history.

(56) References Cited

U.S. PATENT DOCUMENTS

| 8,432,890 B2 * | 4/2013 | Gruber | ................. | H04W 36/14 |
| | | | | 370/349 |
| 2004/0266435 A1 * | 12/2004 | de Jong | ................ | H04W 36/14 |
| | | | | 455/436 |

(Continued)

FOREIGN PATENT DOCUMENTS

| CN | 101133658 | 2/2008 |
| JP | 2005-294979 | 10/2005 |

(Continued)

OTHER PUBLICATIONS

Wei Song et al: "Load balancing for cellular/WLAN integrated networks", IEEE Network, IEEE Service Center, New York, NY, US, vol. 21, No. 1, Jan. 1, 2007 (Jan. 1, 2007), pp. 27-33, XP011168543.

(Continued)

*Primary Examiner* — Ivan O Latorre
(74) *Attorney, Agent, or Firm* — Foley & Lardner LLP

(57) ABSTRACT

Disclosed are a network switching method and device, the method comprising: a UE acquires a preset non-3GPP network performance parameter switching threshold, and acquires a network performance parameter when the UE is in a non-3GPP network; and when the UE determines that the network performance parameter reaches the preset network performance parameter switching threshold, switching the non-3GPP network to a 3GPP network. The technical solution of the present invention compares the monitored network performance parameter of a non-3GPP network with a preset non-3GPP network performance parameter switching threshold, and can switch a service accessing a (Continued)

non-3GPP network and used by a UE from the non-3GPP network to a 3GPP network according to the comparison result, thus avoiding the problem of a UE dropping calls caused by the reduced communication quality of a non-3GPP network, and effectively improving UE communication quality.

18 Claims, 7 Drawing Sheets

(51) Int. Cl.
*H04B 7/06* (2006.01)
*H04M 7/00* (2006.01)
*H04W 36/14* (2009.01)
*H04W 88/06* (2009.01)

(52) U.S. Cl.
CPC .......... *H04W 24/02* (2013.01); *H04W 36/14* (2013.01); *H04W 88/06* (2013.01)

(56) References Cited

U.S. PATENT DOCUMENTS

| | | | |
|---|---|---|---|
| 2005/0221828 A1* | 10/2005 | Wakuta | H04W 36/30 455/437 |
| 2006/0111112 A1 | 5/2006 | Maveddat | |
| 2006/0126565 A1* | 6/2006 | Shaheen | H04W 36/0022 370/331 |
| 2007/0116011 A1* | 5/2007 | Lim | H04L 29/1232 370/395.52 |
| 2008/0119220 A1 | 5/2008 | Bhatia | |
| 2008/0205345 A1* | 8/2008 | Sachs | H04W 36/0011 370/332 |
| 2009/0042576 A1* | 2/2009 | Mukherjee | H04J 11/0093 455/436 |
| 2009/0303966 A1* | 12/2009 | Cherian | H04W 36/0016 370/331 |
| 2010/0150011 A1* | 6/2010 | Kitaji | H04W 36/30 370/252 |
| 2010/0323700 A1* | 12/2010 | Bachmann | H04W 36/0066 455/436 |
| 2011/0019639 A1* | 1/2011 | Karaoguz | H04W 36/0055 370/331 |
| 2012/0099561 A1* | 4/2012 | Zhao | H04W 36/023 370/331 |
| 2012/0196644 A1 | 8/2012 | Scherzer et al. | |
| 2012/0294163 A1* | 11/2012 | Turtinen | H04W 72/042 370/252 |
| 2012/0315905 A1* | 12/2012 | Zhu | H04W 36/36 455/436 |
| 2013/0083726 A1* | 4/2013 | Jain | H04W 4/70 370/328 |
| 2013/0308445 A1* | 11/2013 | Xiang | H04W 28/0231 370/230 |
| 2013/0308527 A1* | 11/2013 | Chin | H04W 36/0022 370/328 |
| 2014/0082697 A1* | 3/2014 | Watfa | H04W 76/15 726/3 |
| 2014/0128075 A1* | 5/2014 | Da Silva | H04W 36/30 455/436 |
| 2014/0161055 A1* | 6/2014 | Chitrapu | H04W 48/18 370/329 |

FOREIGN PATENT DOCUMENTS

| | | |
|---|---|---|
| JP | 2010-506457 | 2/2010 |
| JP | 2010-521876 A | 6/2010 |
| JP | 2012-090272 | 5/2012 |
| WO | WO-2008/060464 | 5/2008 |
| WO | WO-2011/092126 A1 | 8/2011 |
| WO | WO-2011/157177 A2 | 12/2011 |
| WO | WO-2012/044628 A1 | 4/2012 |

OTHER PUBLICATIONS

Lott M et al: "Interworking of WLAN and 3G systems—WLAN systems and interworking", IEE Proceedings : Communications, Institution of Electrical Engineers, GB, vol. 151, No. 5, Jul. 9, 2004 (Jul. 9, 2004), pp. 507-513, XP006022617.
"Architecture enhancements for non-3GPP accesses (Release 11)" 3GPP TS 23.402 V11.5.0, Dec. 31, 2012 (Dec. 31, 2012), section 8.2.1, pp. 153-164.
International Search Report for PCT/CN2014/070903 dated May 6, 2014.

* cited by examiner

--Prior Art--

--Prior Art--

--Prior Art--

--Prior Art--

--Prior Art--

NETWORK SWITCHING METHOD AND DEVICE

This application is a U.S. National Stage of International Application No. PCT/CN2014/070903, filed on 20 Jan. 2014, designating the United States, and claiming the benefit of Chinese Patent Application No. 201310027263.7, filed with the State Intellectual Property Office of People's Republic of China on Jan. 24, 2013 and entitled "Method and device for inter-network handover", which is hereby incorporated by reference in its entirety.

FIELD

The present invention relates to the field of communications and particularly to a method and a device for inter-network handover.

BACKGROUND

At present, there is such a rapidly growing demand of subscribers for communication services that various wireless communication technologies, and related network in which the wireless communication technologies are applied, have emerged, e.g., 2G/3G/4G mobile communication technologies and networks capable of providing wide coverage, and Wireless Fidelity (WiFi) technologies and Wireless Local Area Networks (WLANs) capable of providing hotspot coverage. Due to widespread applications of the various networks, there are scenarios in which different types of wireless communication network coexist, e.g., a scenario in which the 2G or 3G or 4G network coexists with the WLAN. In the scenario in which different types of wireless communication network coexist, a User Equipment (UE) typically makes reasonable selection among the types of network in order to be better served and to save its power. At present there is a technology among cellular communication network technologies to hand over the UE from the 2G or 3G or 4G network to the WLAN so as to offload a service to the WLAN so that the UE is provided with the data service.

An Evolved Packet System (EPS) is a system supporting various access technologies, and mobility between the various access technologies. In the multi-access scenario, the UE may be covered jointly by a number of 3$^{rd}$ Generation Partnership Project (3GPP) and/or non-3GPP access networks, which may operate with different access technologies or may be served by different operators or may provide accesses to different core networks.

For example, FIG. 1 illustrates a scenario in which a Universal Mobile Telecommunication System (UMTS)/Long Term Evolution (LTE) system coexists with the WLAN in the prior art. There are Access Points (APs) of a number of WLANs in a coverage area of an access control network node in the UMTS/LTE system (e.g., a Node B in the UMTS or an eNB in the LTE system), where a coverage area of each access point is smaller than that of the base station.

FIG. 2 illustrates a network architecture in which the UMTS/LTE system interoperates with the WLAN currently supported in the scenario above, where the interoperation in the architecture is achieved via an S2c interface between a Packet Data Network (PDN) Gateway (GW) and the UE. Here both the PDN GW and the AP of the WLAN can exchange information with a server in the Internet.

Further to the network scenario and architecture above, there exists a network selection mechanism implemented under an Access Network Discovery and Selection Function (ANDSF) policy. Particularly FIG. 3 illustrates the architecture of communication between the ANDSF and the UE, where the UE interacts with the ANDSF via an S14 interface which is an interface based upon the Internet Protocol. The UE and the ANDSF communicate in two modes including pull and push modes, where the UE transmits a request on its own initiative to the ANDSF in the former mode, and the ANDSF pushes information on its own initiative in the latter mode. The ANDSF policy is relatively static.

Network discovery and selection related information provided for the UE under the ANDSF policy in the prior art includes the following three categories information:

The first category of information relates to an Inter-System Mobility Policy (ISMP).

The ISMP includes a series of operator defined rules and preferences, and this policy defines whether to allow inter-system mobility, the most appropriate type of access technology to access the Evolved Packet Core (EPC), different priorities of different access technologies, and other information. The ISMP can be preconfigured in the UE or can be transmitted upon being requested by the UE or can be pushed to the UE by the ANDSF under some trigger. For example the ANDSF can issue a policy with the priority of the WLAN being higher than that of the LTE network, so that the WLAN system will be selected preferentially for an access when the UE is covered by both of the networks.

The second category of information relates to Access Network Discovery Information (ANDI).

The ANDSF can provide the UE with a list of access networks, available in proximity thereto, of a requested type of access, and related parameters, e.g., access technologies (e.g., Worldwide Interoperability for Microwave Access (WiMAX), etc.), identifiers of radio access networks, carrier frequencies, etc.

The third category of information relates to an Inter-System Routing Policy (ISRP).

The ISRP includes some information required for inter-system routing, and for a UE with a multi-radio access interface, e.g., a UE supporting IP Flow Mobility (IFOM) or Multi-Access PDN Connectivity (MAPCON), the information can be used to determine:

a) Which of the available access networks to transmit data when a particular routing condition is satisfied; and b) When to prohibit access to some access network for a particular IP data flow and/or a particular Access Point Name (APN).

As specified in the existing protocol, the ANDSF selects the ISMP, the ANDI and the ISRP to be provided to the UE, as required by the operator and according to a roaming protocol, and the ANDSF can provide all of these three policies or can provide only a part of the policies. The ANDSF can interact with some database in the operator network, e.g., a Home Subscriber Server (HSS), etc., to retrieve information as required.

When the UE receives information about an available access network with a higher priority than that of the current access network, the UE shall perform a discovery and reselection procedure to be handed over to the access network with the higher priority if this is allowed by the user. When the UE selects the access network automatically, the UE can not access the EPC through an access network marked as prohibited in the ISMP.

In an existing measurement mechanism in the WLAN system:

As per the IEEE 802.11 protocol, related measurement available in the WLAN include: a channel load measurement to measure the utilization ratio (load) of a channel, which can be derived statistically over an idle period of time in some period of time; a noise histogram measurement to return a histogram of non-IEEE 802.11 noise power in a sampled idle channel; and a link measurement, which is a measurement of a radio frequency characteristic, to reflect an instantaneous quality of a link.

In the existing heterogeneous network scenario, offloading for the UMTS/LTE network to the WLAN is performed generally in two scenarios of seamless offloading and non-seamless offloading as illustrated in FIG. 4 and FIG. 5, where seamless offloading refers to that there is a connection between the WLAN and the 3GPP Core Network (CN), and the service via the air interface subjected to offloading is still directed to the 3GPP (including UMTS/LTE) core network; and non-seamless offloading refers to that there is no connection between the WLAN and the 3GPP CN, and the service via the air interface subjected to offloading is directed to the Internet directly without going through the 3GPP CN.

For offloading to the WLAN, a part of services requested by the UE may be transferred, or all the services requested by the UE may be transferred, and if a part of the services requested by the UE is transferred, then the UE will be connected with both the UMTS/LTE network and the WLAN; or if all the services requested by the UE are transferred, then the UE will be connected with only the WLAN after the service is transferred.

In the prior art, it has been only specified how to perform handover from the 3GPP network to the non-3GPP network, but it has not been specified how to perform handover from the non-3GPP network to the 3GPP network; and moreover the UE selects the network under the relatively static ANDSF policy, so when the UE is provided with the data service over the non-3GPP network after selecting the network, the UE still needs to be provided with the data service over the non-3GPP network even if the quality of the service available over the network is degraded, so that the problem of degrading the quality of communication, and even dropping a call, of the UE may arise.

SUMMARY

Embodiments of the invention provide a method and a device for inter-network handover so as to address the problem in the prior art of degrading the quality of communication, and even dropping a call, of a UE which can not be handed over from a non-3GPP network to a 3GPP network.

Particular technical solutions according to the embodiments of the invention are as follows:

A method for inter-network handover includes:

obtaining, by a UE, a preset handover threshold of non-3GPP network performance parameter;

obtaining a network performance parameter in a case of the UE residing in a non-3GPP network; and performing, by the UE, a handover from the non-3GPP network to a 3GPP network upon determining that the network performance parameter reaches the preset handover threshold of non-3GPP network performance parameter.

In an implementation, the preset handover threshold of non-3GPP network performance parameter includes a preset threshold of network load or a preset threshold of duration of service unavailable or a threshold of channel quality index.

In an implementation, obtaining, by the UE, the preset handover threshold of non-3GPP network performance parameter includes:

obtaining, by the UE, the preset handover threshold of non-3GPP network performance parameter transmitted by a base station; or obtaining, by the UE, the preset handover threshold of non-3GPP network performance parameter in the UE.

Further to any one of the embodiments above, the case of the UE residing in the non-3GPP network includes:

the case that all of services requested by the UE are being provided via an access to the non-3GPP network; or a part of services requested by the UE are being provided via an access to the non-3GPP network.

Further to the embodiment above, performing by the UE the handover from the non-3GPP network to a 3GPP network upon determining that the network performance parameter reaches the preset handover threshold of non-3GPP network performance parameter includes:

when the network performance parameter is a network load, if the UE determines that the network load reaches the preset threshold of network load, then handing over the services requested by the UE being provided via the access to the non-3GPP network from the non-3GPP network to the 3GPP network; or when the network performance parameter is a duration of service unavailable, if the UE determines that the duration of service unavailable reaches the preset threshold of duration of service unavailable, then handing over the services requested by the UE being provided via the access to the non-3GPP network from the non-3GPP network to the 3GPP network; or when the network performance parameter is a channel quality index, if the UE determines that the channel quality index reaches the preset threshold of channel quality index, then handing over the services requested by the UE being provided via the access to the non-3GPP network handed over from the non-3GPP network to the 3GPP network.

In an implementation, handing over the services requested by the UE being provided via the access to the non-3GPP network from the non-3GPP network to the 3GPP network includes:

transmitting, by an access stratum of the UE, a handover instruction message to a non-access stratum of the UE; and informing, by the non-access stratum of the UE, the network side upon receiving the handover instruction message to modify a routing table of the services requested by the UE being provided via the access to the non-3GPP network and to hand over the services from the non-3GPP network to the 3GPP network.

In an implementation, performing by the UE the handover from the non-3GPP network to the 3GPP network upon determining that the network performance parameter reaches the preset handover threshold of non-3GPP network performance parameter includes:

handing over all the services requested by the UE from the non-3GPP network to the 3GPP network when all the services are being provided via the access to the non-3GPP network and the UE determines that the network performance parameter reaches the preset handover threshold of non-3GPP network performance parameter; and handing over the part of the services requested by the UE from the non-3GPP network to the 3GPP network when the part of the services are being provided via the access to the non-3GPP network and it is determined that the network performance parameter reaches the preset handover threshold of non-3GPP network performance parameter.

Furthermore after handing over the part of the services requested by the UE from the non-3GPP network to the 3GPP network, the method further includes:

if the part of the services requested by the UE being provided via an access to the 3GPP network has been terminated, then having a subsequent service requested by the UE provided via the access to the 3GPP network or the non-3GPP network under an Access Network Discovery and Selection Function (ANDSF) policy; or if the part of the services requested by the UE being provided via an access to the 3GPP network has not been terminated, then obtaining the network performance parameter corresponding to the non-3GPP network; and when it is determined that the network performance parameter does not reach the preset handover threshold of non-3GPP network performance parameter, handing over the part of the services requested by the UE from the 3GPP network to the non-3GPP network.

A method for inter-network handover includes:

obtaining a preset handover threshold of non-3GPP network performance parameter; and transmitting the preset handover threshold of non-3GPP network performance parameter to a UE to instruct the UE to be handed over from a non-3GPP network to a 3GPP network when the UE determines that a network performance parameter obtained in the case of the UE residing in the non-3GPP network reaches the preset handover threshold of non-3GPP network performance parameter.

In an implementation, the preset handover threshold of non-3GPP network performance parameter includes a preset threshold of network load or a preset threshold of duration of service unavailable or a threshold of channel quality index.

A device for inter-network handover includes:

a first obtaining unit configured to obtain a preset handover threshold of non-3GPP network performance parameter;

a second obtaining unit configured to obtain a network performance parameter in a case of the device residing in a non-3GPP network; and a handover unit configured to perform a handover from the non-3GPP network to a 3GPP network upon determining that the network performance parameter reaches the preset handover threshold of non-3GPP network performance parameter.

In an implementation, the preset handover threshold of non-3GPP network performance parameter obtained by the first obtaining unit includes a preset threshold of network load or a preset threshold of duration of service unavailable or a threshold of channel quality index.

In an implementation, the second obtaining unit is configured: to obtain the preset handover threshold of non-3GPP network performance parameter transmitted by a base station; or to obtain the preset handover threshold of non-3GPP network performance parameter in the device.

Further to any one of the embodiments above, the case of the device residing in the non-3GPP network includes: the case that all of services requested by the UE are being provided via an access to the non-3GPP network; or the case that a part of services requested by the UE are being provided via an access to the non-3GPP network.

In an implementation, the handover unit is configured: when the network performance parameter is a network load, if it is determined that the network load reaches the preset threshold of network load, to hand over the services requested by the device being provided via the access to the non-3GPP network from the non-3GPP network to the 3GPP network; or when the network performance parameter is a duration of service unavailable, if it is determined that the duration of service unavailable reaches the preset threshold of duration of service unavailable, to hand over the services requested by the device being provided via the access to the non-3GPP network from the non-3GPP network to the 3GPP network; or when the network performance parameter is a channel quality index, if it is determined that the channel quality index reaches the preset threshold of channel quality index, to hand over the services requested by the device being provided via the access to the non-3GPP network from the non-3GPP network to the 3GPP network.

In an implementation, the handover unit is configured: to have an access stratum of the device transmits a handover instruction message to a non-access stratum thereof so that the non-access stratum of the device informs the network side upon receiving the handover instruction message to modify a routing table of the services requested by the device being provided via the access to the non-3GPP network and to hand over the services from the non-3GPP network to the 3GPP network.

In an implementation, the handover unit is configured: to hand over all the services requested by the device from the non-3GPP network to the 3GPP network when all the services are being provided via the access to the non-3GPP network and it is determined that the network performance parameter reaches the preset handover threshold of non-3GPP network performance parameter; and to hand over the part of the services requested by the device from the non-3GPP network to the 3GPP network when the part of the services are being provided via the access to the non-3GPP network and it is determined that the network performance parameter reaches the preset handover threshold of non-3GPP network performance parameter.

In an implementation, the handover unit is further configured: if the part of the services requested by the device being provided via an access to the 3GPP network has been terminated, to have a subsequent service requested by the device provided via the access to the 3GPP network or the non-3GPP network under an Access Network Discovery and Selection Function (ANDSF) policy; or if the part of the services requested by the UE being provided via an access to the 3GPP network has not been terminated, to obtain the network performance parameter corresponding to the non-3GPP network; and when it is determined that the network performance parameter does not reach the preset handover threshold of non-3GPP network performance parameter, to hand over the part of the services requested by the device from the 3GPP network to the non-3GPP network.

A device for inter-network handover includes:

an obtaining unit configured to obtain a preset handover threshold of non-3GPP network performance parameter; and a transmitting unit configured to transmit the preset handover threshold of non-3GPP network performance parameter to a UE to instruct the UE to be handed over from a non-3GPP network to a 3GPP network when the UE determines that a network performance parameter obtained in the case of the UE residing in the non-3GPP network reaches the preset handover threshold of non-3GPP network performance parameter.

In an implementation, the preset handover threshold of non-3GPP network performance parameter includes a preset threshold of network load or a preset threshold of duration of service unavailable or a threshold of channel quality index.

A user equipment includes a transceiver, and at least one processor connected with the transceiver, wherein:

the processor is configured to obtain a preset handover threshold of non-3GPP network performance parameter to obtain a network performance parameter in a case of the UE residing in a non-3GPP network; and to perform a handover from the non-3GPP network to a 3GPP network upon determining that the network performance parameter reaches the preset handover threshold of non-3GPP network performance parameter.

In an implementation, the preset handover threshold of non-3GPP network performance parameter obtained by the processor includes a preset threshold of network load or a preset threshold of duration of service unavailable or a threshold of channel quality index.

In an implementation, the processor is configured: to obtain the preset handover threshold of non-3GPP network performance parameter transmitted by a base station through the transceiver; or to obtain the preset handover threshold of non-3GPP network performance parameter in the UE.

In an implementation, the processor is configured: when the network performance parameter is a network load, if it is determined that the network load reaches the preset threshold of network load, to hand over services requested by the UE being provided via the access to the non-3GPP network from the non-3GPP network to the 3GPP network; or when the network performance parameter is a duration of service unavailable, if it is determined that the duration of service unavailable reaches the preset threshold of duration of service unavailable, to hand over the services requested by the UE being provided via the access to the non-3GPP network from the non-3GPP network to the 3GPP network; or when the network performance parameter is a channel quality index, if it is determined that the channel quality index reaches the preset threshold of channel quality index, to hand over the services requested by the UE being provided via the access to the non-3GPP network from the non-3GPP network to the 3GPP network.

In an implementation, the processor is configured: to have an access stratum of the UE transmit a handover instruction message to a non-access stratum thereof so that the non-access stratum of the UE informs the network side upon receiving the handover instruction message to modify a routing table of the services requested by the UE being provided via the access to the non-3GPP network and to hand over the services from the non-3GPP network to the 3GPP network.

In an implementation, the processor is configured: to hand over all of services requested by the UE from the non-3GPP network to the 3GPP network when all the services are being provided via the access to the non-3GPP network and it is determined that the network performance parameter reaches the preset handover threshold of non-3GPP network performance parameter; and to hand over the part of the services requested by the UE from the non-3GPP network to the 3GPP network when the part of the services are being provided the non-3GPP network and it is determined that the network performance parameter reaches the preset handover threshold of non-3GPP network performance parameter.

In an implementation, the processor is further configured: if the part of the services requested by the UE being provided via an access to the 3GPP network has been terminated, to have a subsequent service requested by the UE provided via the access to the 3GPP network or the non-3GPP network under an Access Network Discovery and Selection Function (ANDSF) policy; or if the part of the services requested by the UE being provided via an access to the 3GPP network has not been terminated, to obtain the network performance parameter corresponding to the non-3GPP network; and when it is determined that the network performance parameter does not reach the preset handover threshold of non-3GPP network performance parameter, to hand over the part of the services requested by the UE from the 3GPP network to the non-3GPP network.

A base station includes a transceiver, and at least one processor connected with the transceiver, wherein:

the processor is configured to obtain a preset handover threshold of non-3GPP network performance parameter; and the transceiver is configured to transmit the preset handover threshold of non-3GPP network performance parameter to a UE to instruct the UE to be handed over from a non-3GPP network to a 3GPP network when the UE determines that a network performance parameter obtained in the case of the UE residing in the non-3GPP network reaches the preset handover threshold of non-3GPP network performance parameter.

In an implementation, the preset handover threshold of non-3GPP network performance parameter obtained by the processor includes a preset threshold of network load or a preset threshold of duration of service unavailable or a threshold of channel quality index.

In the embodiments of the invention, a UE obtains a preset handover threshold of non-3GPP network performance parameter, and obtains a network performance parameter in a case of the UE residing in a non-3GPP network; and the UE performs a handover from the non-3GPP network to a 3GPP network upon determining that the network performance parameter reaches the preset handover threshold of non-3GPP network performance parameter. With the technical solutions according to the invention, the detected network performance parameter of the non-3GPP network can be compared with the preset handover threshold of non-3GPP network performance parameter, and a service requested by the UE being provided via the access to the non-3GPP network can be handed over from the non-3GPP network to the 3GPP network according to a result of comparison, to thereby improve effectively the quality of communication of the UE and avoid the problem of dropping a call of the UE due to a degraded quality of communication over the non-3GPP network.

DETAILED DESCRIPTION OF THE EMBODIMENTS

In order to address such a problem in the prior art that when a UE is provided with a data service over a non-3GPP network after selecting the network, the UE still needs to be provided with the data service over the non-3GPP network even if the quality of the service available over the network is degraded, thus degrading the quality of communication, and even dropping a call, of the UE, in the embodiments of the invention, a UE obtains a preset handover threshold of non-3GPP network performance parameter, and obtains a network performance parameter in a case of the UE residing in a non-3GPP network; and the UE performs a handover from the non-3GPP network to a 3GPP network upon determining that the network performance parameter reaches the preset handover threshold of non-3GPP network performance parameter. With the technical solutions according to the invention, the detected network performance parameter of the non-3GPP network can be compared with the preset handover threshold of non-3GPP network performance parameter, and a service requested by the UE being provided via the access to the non-3GPP network can be handed over from the non-3GPP network to the 3GPP network according to a result of comparison, to thereby improve effectively the quality of communication of the UE and avoid the problem of dropping a call of the UE due to a degraded quality of communication over the non-3GPP network.

A service carried in the scenario with non-seamless offloading will not pass a 3GPP core network, so the invention will only address handover between the 3GPP network and the non-3GPP network in the scenario with seamless offloading. Preferred embodiments of the invention will be described below with reference to the drawings.

Figure 1:
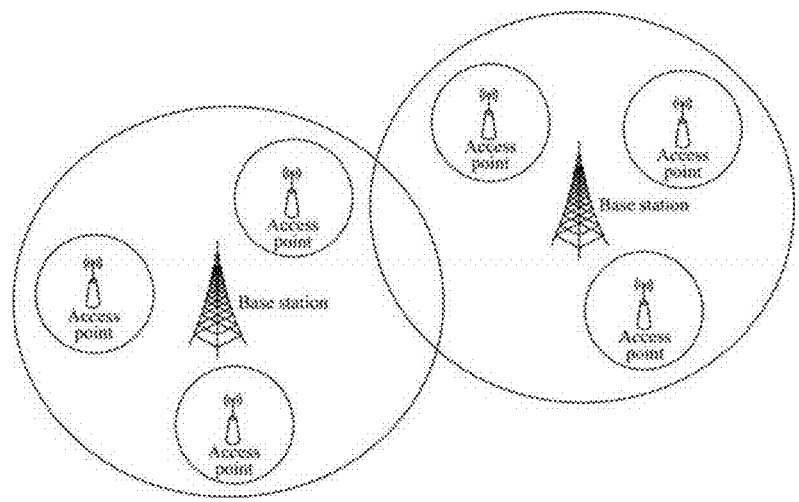
FIG. 1 illustrates a schematic diagram of the scenario in which the UMTS/LTE network coexists with the WLAN in the prior art.
Figure 2:
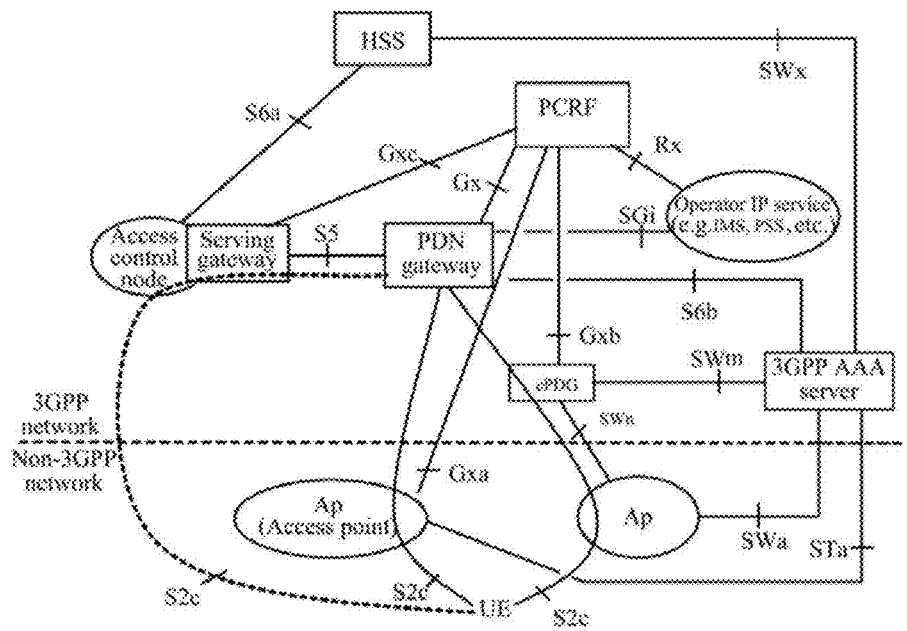
FIG. 2 illustrates a schematic diagram of the network architecture in which the UMTS/LTE network interoperates with the WLAN in the prior art.
Figure 3:
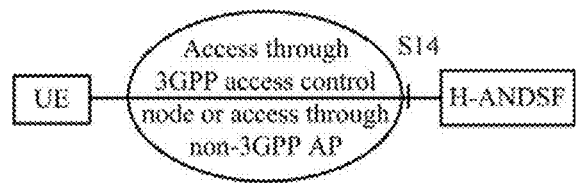
FIG. 3 illustrates a schematic diagram of the architecture of communication between the ANDSF and the UE in the prior art.
Figure 4:
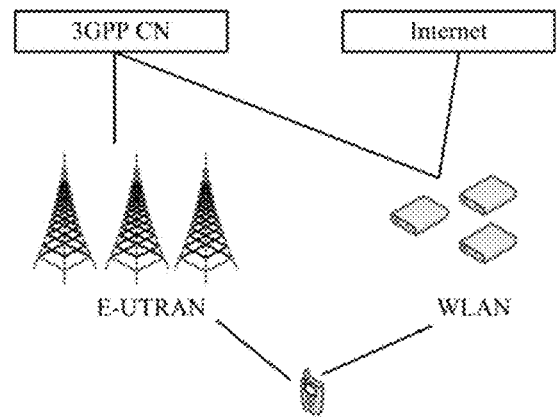
FIG. 4 illustrates a schematic diagram of the scenario of seamless offloading in the prior art.
Figure 5:
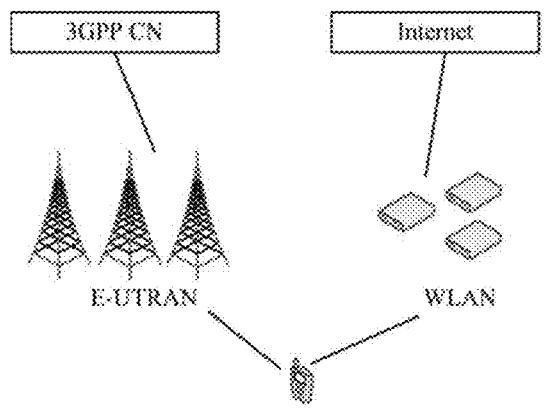
FIG. 5 illustrates a schematic diagram of the scenario of non-seamless offloading in the prior art.
Figure 6:
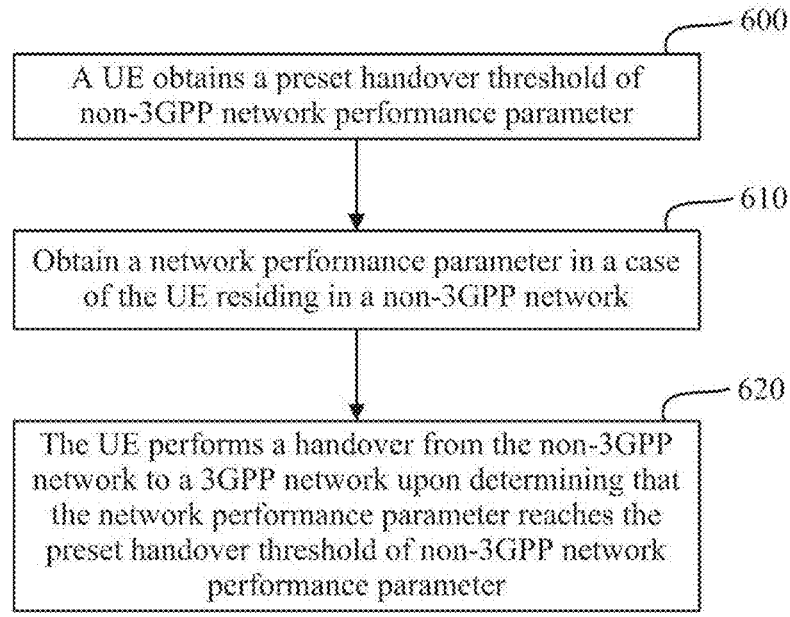
FIG. 6 illustrates a detailed flow chart of inter-network handover according to an embodiment of the invention.

Referring to FIG. 6, a detailed flow of inter-network handover in the embodiments of the invention is as follows:

Step 600: A UE obtains a preset handover threshold of non-3GPP network performance parameter.

In the embodiments of the invention, the preset handover threshold of non-3GPP network performance parameter can be a handover threshold of non-3GPP network performance parameter preset by a base station; or can be a preset handover threshold of non-3GPP network performance parameter in the UE itself. Furthermore the preset handover threshold of non-3GPP network performance parameter can be a preset threshold of network load or can be a preset threshold of duration of service unavailable or can be a threshold of channel quality index.

If the preset handover threshold of non-3GPP network performance parameter is preset by the base station, then the base station transmits the preset handover threshold of non-3GPP network performance parameter to the UE after obtaining the preset handover threshold of non-3GPP network performance parameter, and the UE obtains the preset handover threshold of non-3GPP network performance parameter.

Step 610: The UE obtains a network performance parameter in a case of the UE residing in a non-3GPP network.

In the embodiments of the invention, the UE resides in the non-3GPP network, which means that all of services requested by the UE are being provided via an access to the non-3GPP network, or a part of the services requested by the UE are being provided via an access to the non-3GPP network. For example, if the UE currently selects a network under an IMSP policy in an ANDSF, all the services requested by the UE can only be provided via an access to one type of network, for example, all the services requested by the UE are provided via an access to a 3GPP network; and if the UE currently selects a network under an ISRP policy in the ANDSF, then the services requested by the UE can be provided via accesses to two types of networks, for example, a service 1 requested by the UE may be provided via the access to the 3GPP network, and a service 2 requested by the UE may be provided via the access to an WLAN.

The network performance parameter obtained by the UE corresponding to the preset handover threshold of non-3GPP network performance parameter can be a network load or can be a duration of service unavailable or can be a channel quality index.

Step 620: The UE performs a handover from the non-3GPP network to a 3GPP network upon determining that the network performance parameter reaches the preset handover threshold of non-3GPP network performance parameter.

When the UE determines the network performance parameter reaches the preset handover threshold of non-3GPP network performance parameter, an access stratum of the UE transmits a handover instruction message to a non-access stratum thereof, where the handover instruction message carries an instruction to perform a handover for the UE from the non-3GPP network to the 3GPP network; and the non-access stratum of the UE informs the network side upon receiving the handover instruction message to modify a routing table of the service requested by the UE being provided via the access to the non-3GPP network and to hand over the service requested by the UE being provided via the access to the non-3GPP network from the non-3GPP network to the 3GPP network. In the embodiments of the invention, the UE informs the network side to modify the routing table of the corresponding service thereof being provided via the access to the non-3GPP network to thereby ensure the ongoing service requested by the UE to be handed over from the non-3GPP network to the 3GPP network without any interruption of the service.

In the embodiments of the invention, the UE is handed over between the networks according to the network performance parameter particularly as follows:

When the network performance parameter is a network load, if the UE determines that the network load obtained by the UE reaches the preset threshold of network load, that is, the network load is more than the preset threshold of network load, then the service requested by the UE being provided via the access to the non-3GPP network is handed over from the non-3GPP network to the 3GPP network. The network load can be obtained from information carried in an MAC frame transmitted by the non-3GPP network.

When the network performance parameter is a duration of service unavailable, if the UE determines that the duration of service unavailable obtained by the UE reaches the preset threshold of duration of service unavailable, that is, the duration of service unavailable is more than the preset threshold of duration of service unavailable (a Quality of Service (QoS) can not be guaranteed), then the service requested by the UE being provided via the access to the non-3GPP network is handed over from the non-3GPP network to the 3GPP network.

When the network performance parameter is a channel quality index, if the UE determines that the channel quality index obtained by the UE reaches the preset threshold of channel quality index, that is, the channel quality index is less than the preset threshold of channel quality index (at this time no radio link failure has occurred), then the service requested by the UE being provided via the access to the non-3GPP network is handed over from the non-3GPP network to the 3GPP network. The channel quality index can be used as the network performance parameter to thereby avoid the channel quality index of the non-3GPP network from being kept degraded until no connection is made.

When the UE selects a network under different policies, different service access policies will be applied to the UE, so the UE will be handed over between the networks for the different service access policies, particularly as follows:

When all the services requested by the UE are being provided via the access to the non-3GPP network and the UE determines that the network performance parameter obtained by the UE reaches the preset handover threshold of non-3GPP network performance parameter, all the services requested by the UE are handed over from the non-3GPP network to the 3GPP network.

When a part of the services requested by the UE are being provided via the access to the non-3GPP network and the UE determines that the network performance parameter obtained by the UE reaches the preset handover threshold of non-3GPP network performance parameter, a part of the services requested by the UE are handed over from the non-3GPP network to the 3GPP network. For example, if the service 1 requested by the UE are being provided via the access to the 3GPP network, and the service 2 requested by the UE are being provided via the access to the non-3GPP network, then when the UE determines that the network performance parameter obtained by the UE reaches the preset handover threshold of non-3GPP network performance parameter, the service 2 requested by the UE is handed over from a WLAN to the 3GPP network.

If the UE selects a network under the ISRP policy in the ANDSF, then after a part of the services requested by the UE is handed over from the non-3GPP network to the 3GPP network, if the part of the services requested by the UE being provided via an access to the 3GPP network has been terminated, then a subsequent service requested by the UE are to be provided via the access to the 3GPP network or the non-3GPP network in response to an instruction in the ANDSF policy; or if the part of the services requested by the UE being provided via an access to the 3GPP network has not been terminated, then the network performance parameter corresponding to the non-3GPP network is obtained by two separate modules capable of exchanging information in the UE; and when it is determined that the network performance parameter does not reach the preset handover threshold of non-3GPP network performance parameter, the part of the services requested by the UE is handed over from the 3GPP network to the non-3GPP network. In the embodiments of the invention, the UE includes the 3GPP module and the non-3GPP module, which are two separate modules capable of operating concurrently or separately and of exchanging information with each other, so the UE residing in the 3GPP network still can obtain the network performance parameter of the non-3GPP network using the non-3GPP module of the UE so that the UE can detect the network performance parameter of the non-3GPP network conveniently in real time and decide whether to be handed over between the networks, according to the network performance parameter.

Figure 7:
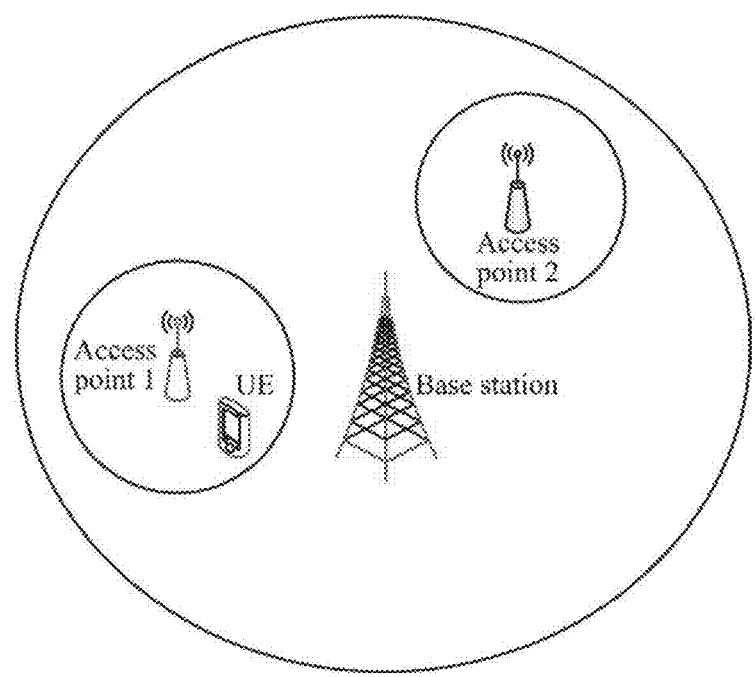
FIG. 7 illustrates a scenario in which network coexist according to an embodiment of the invention.

The inter-network handover process will be described below in details in connection with particular application scenarios referring to FIG. 7 illustrating an instance in which the UE resides in an area covered by both a base station, and an access point 1 in a WLAN, and the preset handover threshold of non-3GPP network performance parameter is configured by the base station (a Node B in a UMTS system, or an eNB in an LTE system).

First Embodiment

Figure 8:
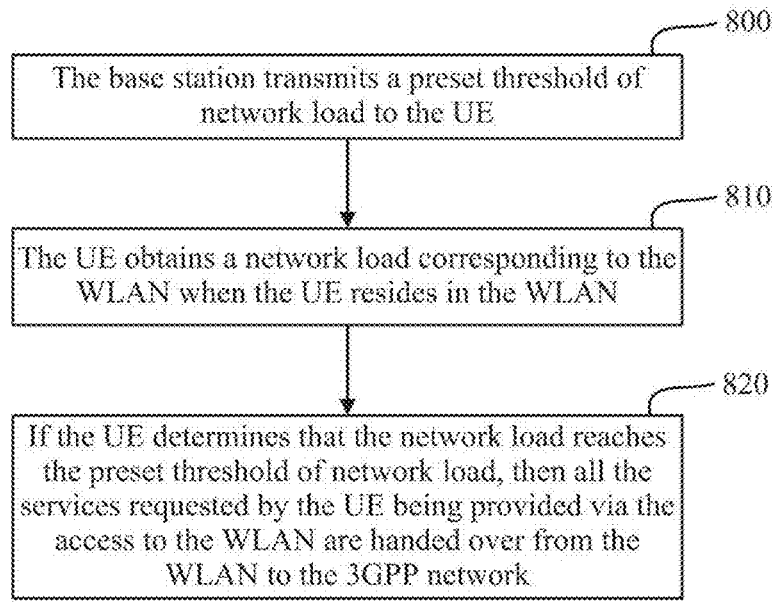
FIG. 8 illustrates a first flow chart of inter-network handover in a particular application scenario according to an embodiment of the invention.

Referring to FIG. 8, when the UE currently selects a network under the ISMP policy in the ANDSF, and the network performance parameter is a network load, a particular inter-network handover flow is as follows:

Step 800: The base station transmits a preset threshold of network load to the UE.

In the embodiment of the invention, when the network performance parameter is a network load, the corresponding preset handover threshold of non-3GPP network performance parameter is a preset threshold of network load.

Step 810: The UE obtains a network load corresponding to the WLAN when the UE resides in the WLAN.

In the embodiment of the invention, the UE currently selects a network under the ISMP policy in the ANDSF, so the UE resides in the WLAN, which means that all the services requested by the UE are being provided via the access to the WLAN. If the UE currently communicates with the base station, that is, all the services requested by the UE are being provided via the access to the 3GPP network, then after the UE detects the access point 1, the UE is disconnected from the base station, and connected with the access point 1, that is, all the services requested by the UE are being provided via the access to the WLAN, under the ISMP policy. The UE connected with the access point 1 detects a network load of the access point 1 in real time. The UE can obtain the network load from information carried in an MAC frame transmitted by the access point 1.

Step 820: If the UE determines that the network load reaches the preset threshold of network load, then all the services requested by the UE being provided via the access to the WLAN are handed over from the WLAN to the 3GPP network.

In the embodiment of the invention, when the UE determines that the network load reaches the preset threshold of network load, the access stratum of the UE transmits a handover instruction message to the non-access stratum thereof, where the handover instruction message carries an instruction to perform a handover for the UE from the WLAN to the 3GPP network; and the non-access stratum of the UE informs the network side upon receiving the handover instruction message to modify a routing table of the services requested by the UE being provided via the access to the WLAN and to hand over all the services requested by the UE from the WLAN to the 3GPP network to thereby ensure the ongoing services requested by the UE to be handed over from the non-3GPP network to the 3GPP network without any interruption of the services.

Second Embodiment

Figure 9:
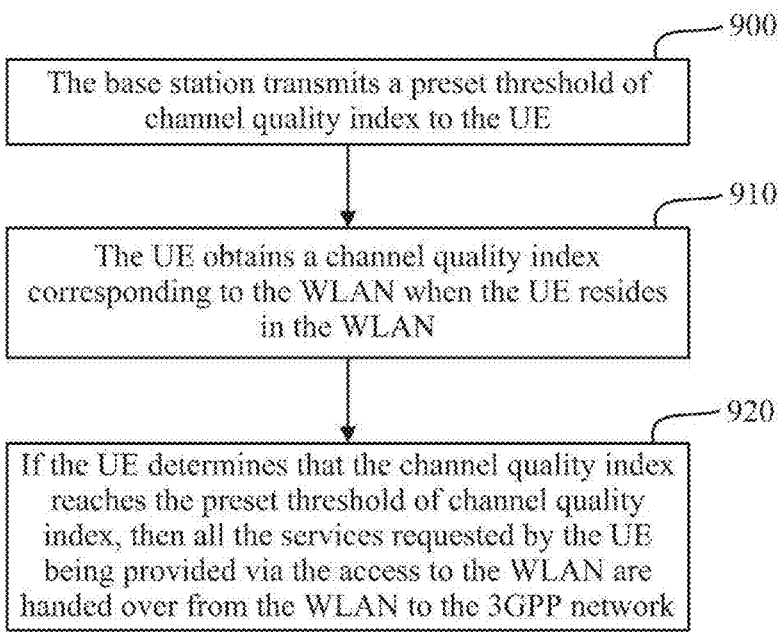
FIG. 9 illustrates a second flow chart of inter-network handover in a particular application scenario according to an embodiment of the invention.

Referring to FIG. 9, when the UE currently selects a network under the ISMP policy in the ANDSF, and the network performance parameter is a channel quality index, a particular inter-network handover flow is as follows:

Step 900: The base station transmits a preset threshold of channel quality index to the UE;

In the embodiment of the invention, when the network performance parameter is a channel quality index, the corresponding preset handover threshold of non-3GPP network performance parameter is a preset threshold of channel quality index.

Step 910: The UE obtains a channel quality index corresponding to the WLAN when the UE resides in the WLAN.

In the embodiment of the invention, the UE currently selects a network under the ISMP policy in the ANDSF, so the UE resides in the WLAN, which means that all the services requested by the UE are being provided via the access to the WLAN. If the UE currently communicates with the base station, that is, all the services requested by the UE are being provided via the access to the 3GPP network, then after the UE detects the access point 1, the UE is disconnected from the base station, and connected with the access point 1, that is, all the services requested by the UE are being provided via the access to the WLAN, under the ISMP policy. The UE connected with the access point 1 detects a channel quality index of the access point 1 in real time.

Step 920: If the UE determines that the channel quality index reaches the preset threshold of channel quality index, then all the services requested by the UE being provided via the access to the WLAN are handed over from the WLAN to the 3GPP network.

In the embodiment of the invention, when the UE determines that the channel quality index reaches the preset threshold of channel quality index, the access stratum of the UE transmits a handover instruction message to the non-access stratum thereof, where the handover instruction message carries an instruction to perform a handover for the UE from the WLAN to the 3GPP network; and the non-access stratum of the UE informs the network side upon receiving the handover instruction message to modify a routing table of the services requested by the UE being provided via the access to the WLAN and to hand over all the services requested by the UE from the WLAN to the 3GPP network to thereby ensure the ongoing services requested by the UE to be handed over from the non-3GPP network to the 3GPP network without any interruption of the services.

Third Embodiment

Figure 10:
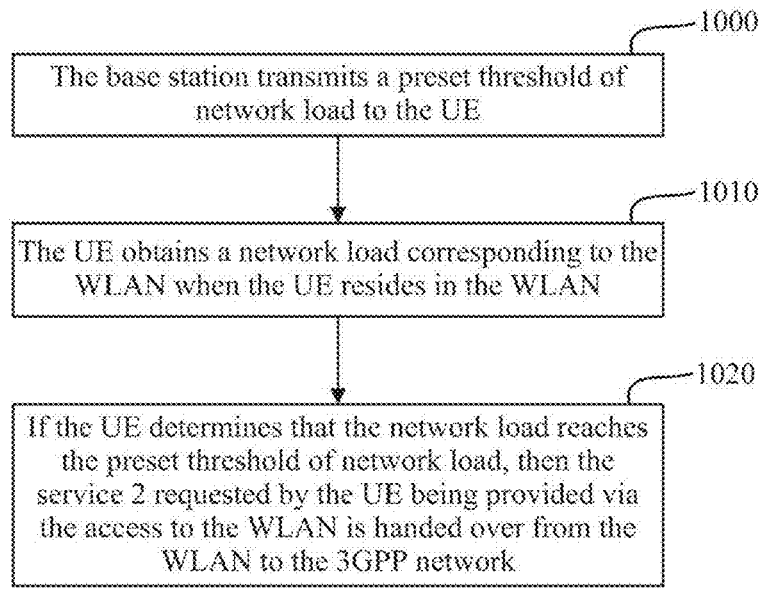
FIG. 10 illustrates a third flow chart of inter-network handover in a particular application scenario according to an embodiment of the invention.

Referring to FIG. 10, when the UE currently selects a network under the ISRP policy in the ANDSF, and the network performance parameter is a network load, a particular inter-network handover flow is as follows:

Step 1000: The base station transmits a preset threshold of network load to the UE.

In the embodiment of the invention, when the network performance parameter is a network load, the corresponding preset handover threshold of non-3GPP network performance parameter is a preset threshold of network load.

Step 1010: The UE obtains a network load corresponding to the WLAN when the UE resides in the WLAN.

In the embodiment of the invention, the UE currently selects a network under the ISRP policy in the ANDSF, so the UE resides in the WLAN, which means that a part of the services requested by the UE are being provided via the WLAN. If the UE currently communicates with the base station and sets up two services, which are the service 1 and the service 2 respectively, with the base station, that is, the service 1 and the service 2 requested by the UE are being provided via the access to the 3GPP network, then after the UE detects the access point 1, the UE disconnects the service 2 from the base station and connects the service 2 with the access point 1, that is, the service 2 requested by the UE are to be provided via the access to the WLAN, under the ISRP policy. The UE connected with the access point 1 detects a network load of the access point 1 in real time. The UE can obtain the network load from information carried in an MAC frame transmitted by the access point 1.

Step 1020: If the UE determines that the network load reaches the preset threshold of network load, then the service 2 requested by the UE being provided via the access to the WLAN is handed over from the WLAN to the 3GPP network.

In the embodiment of the invention, when the UE determines that the network load reaches the preset threshold of network load, the access stratum of the UE transmits a handover instruction message to the non-access stratum thereof, where the handover instruction message carries an instruction to perform a handover for the UE from the WLAN to the 3GPP network; and the non-access stratum of the UE informs the network side upon receiving the handover instruction message to modify a routing table of the service requested by the UE being provided via the access to the WLAN and to hand over the service 2 requested by the UE from the WLAN to the 3GPP network to thereby ensure the ongoing service 2 requested by the UE to be handed over from the non-3GPP network to the 3GPP network without any interruption of the services.

In the embodiment of the invention, after the part of the services requested by the UE is handed over from the WLAN to the 3GPP network, if the service 2 requested by the UE being provided via an access to the 3GPP network has been terminated, then a subsequent service requested by the UE are to be provided via the access the 3GPP network or the WLAN in response to an instruction in the ANDSF policy; or if the service 2 requested by the UE being provided via an access to the 3GPP network has not been terminated, a network load corresponding to the WLAN is detected in real time by two separate modules capable of exchanging information in the UE; and when it is determined that the network load does not reach the preset threshold of network load, the service 2 requested by the UE is handed over from the WLAN to the 3GPP network.

Fourth Embodiment

Figure 11:
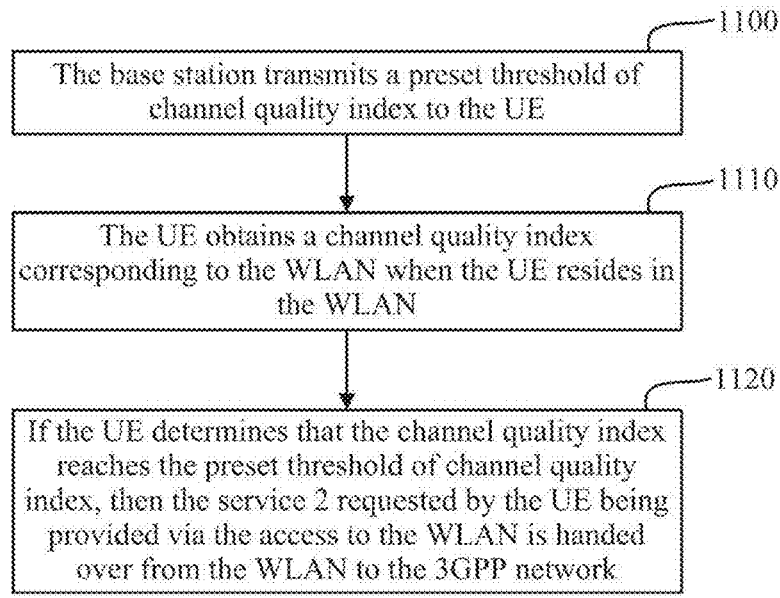
FIG. 11 illustrates a fourth flow chart of inter-network handover in a particular application scenario according to an embodiment of the invention.

Referring to FIG. 11, when the UE currently selects a network under the ISRP policy in the ANDSF, and the network performance parameter is a channel quality index, a particular inter-network handover flow is as follows:

Step 1100: The base station transmits a preset threshold of channel quality index to the UE.

In the embodiment of the invention, when the network performance parameter is a channel quality index, the corresponding preset handover threshold of non-3GPP network performance parameter is a preset threshold of channel quality index.

Step 1110: The UE obtains a channel quality index corresponding to the WLAN when the UE resides in the WLAN.

In the embodiment of the invention, the UE currently selects a network under the ISRP policy in the ANDSF, so the UE resides in the WLAN, which means that a part of the services requested by the UE are being provided via the WLAN. If the UE currently communicates with the base station and sets up two services, which are the service 1 and the service 2 respectively, with the base station, that is, the service 1 and the service 2 requested by the UE are being provided via an access to the 3GPP network, then after the UE detects the access point 1, the UE disconnects the service 2 from the base station and connects the service 2 with the access point 1, that is, the service 2 requested by the UE are to be provided via an access to the WLAN, under the ISRP policy. The UE connected with the access point 1 detects a channel quality index of the access point 1 in real time.

Step 1120: If the UE determines that the channel quality index reaches the preset threshold of channel quality index, then the service 2 requested by the UE being provided via the access to the WLAN is handed over from the WLAN to the 3GPP network.

In the embodiment of the invention, when the UE determines that the channel quality index reaches the preset threshold of channel quality index, the access stratum of the UE transmits a handover instruction message to the non-access stratum thereof, where the handover instruction message carries an instruction to perform a handover for the UE from the WLAN to the 3GPP network; and the non-access stratum of the UE informs the network side upon receiving the handover instruction message to modify a routing table of the service requested by the UE and to hand over the service 2 requested by the UE from the WLAN to the 3GPP network to thereby ensure the ongoing service 2 requested by the UE to be handed over from the non-3GPP network to the 3GPP network without any interruption of the services.

In the embodiment of the invention, after the part of the services requested by the UE is handed over from the WLAN to the 3GPP network, if the service 2 requested by the UE being provided via an access to the 3GPP network has been terminated, then a subsequent service requested by the UE are to be provided via the access to the 3GPP network or the WLAN in response to an instruction in the ANDSF policy; or if the service 2 requested by the UE being provided via the access to the 3GPP network has not been terminated, a channel quality index corresponding to the WLAN is detected in real time by two separate modules capable of exchanging information in the UE; and when it is determined that the channel quality index does not reach the preset threshold of channel quality index, the service 2 requested by the UE is handed over from the WLAN to the 3GPP network.

Figure 12:
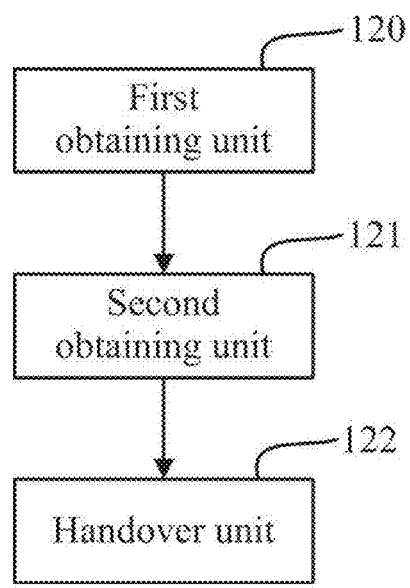
FIG. 12 illustrates a schematic structural diagram of a device for inter-network handover according to an embodiment of the invention.
Figure 13:
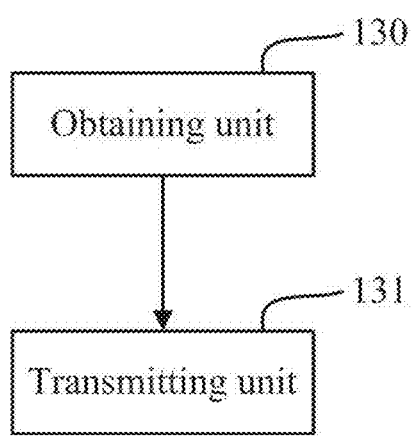
FIG. 13 illustrates a schematic structural diagram of a device for inter-network handover according to an embodiment of the invention.

Further to the respective embodiments above, referring to FIG. 12, a device for inter-network handover according to an embodiment of the invention includes a first obtaining unit 120, a second obtaining unit 121, and a handover unit 122, where:

The first obtaining unit 120 is configured to obtain a preset handover threshold of non-3GPP network performance parameter;

The second obtaining unit 121 is configured to obtain a network performance parameter in a case of the device residing in a non-3GPP network; and The handover unit 122 is configured to perform a handover from the non-3GPP network to a 3GPP network upon determining that the network performance parameter reaches the preset handover threshold of non-3GPP network performance parameter.

Further to the respective embodiments above, referring to FIG. 12, a device for inter-network handover according to an embodiment of the invention includes a first obtaining unit 130 and a transmitting unit 131, where:

The obtaining unit 130 is configured to obtain a preset handover threshold of non-3GPP network performance parameter; and The transmitting unit 131 is configured to transmit the preset handover threshold of non-3GPP network performance parameter to a UE to instruct the UE to be handed over from a non-3GPP network to a 3GPP network when the UE determines that a network performance parameter obtained in the case of the UE residing in the non-3GPP network reaches the preset handover threshold of non-3GPP network performance parameter.

Particular operations performed by the first obtaining unit 120, the second obtaining unit 121, and the handover unit 122, and the obtaining unit 131, and transmitting unit 132 correspond to the methods in the embodiments above, so a repeated description thereof will be omitted here.

Figure 14:
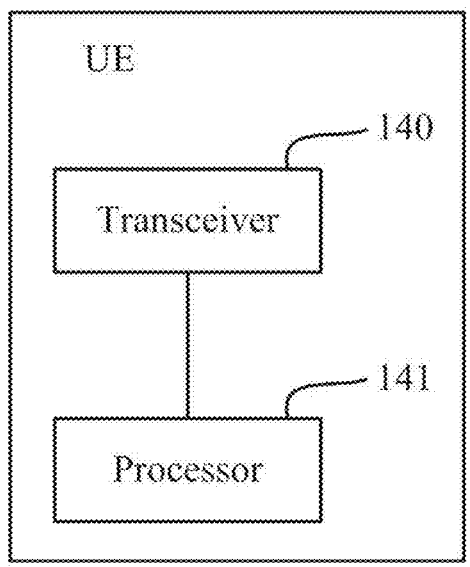
FIG. 14 illustrates a schematic diagram of a UE according to an embodiment of the invention.

The structure of and processing by the UE according to the embodiment of the invention will be described below in connection with a preferred hardware structure. Referring to FIG. 14, the UE includes a transceiver 140, and at least one processor 141 connected with the transceiver 140, where:

The processor 141 is configured to obtain a preset handover threshold of non-3GPP network performance parameter, to obtain a network performance parameter in a case of the UE residing in a non-3GPP network; and to perform a handover from the non-3GPP network to a 3GPP network upon determining that the network performance parameter reaches the preset handover threshold of non-3GPP network performance parameter.

In an implementation, the preset handover threshold of non-3GPP network performance parameter obtained by the processor 141 includes a preset threshold of network load or a preset threshold of duration of service unavailable or a threshold of channel quality index.

In an implementation, the processor 141 is configured to obtain the preset handover threshold of non-3GPP network performance parameter transmitted by a base station through the transceiver 140; or to obtain the preset handover threshold of non-3GPP network performance parameter in the UE.

In an implementation, the case of the UE residing in the non-3GPP network includes: the case that all of services requested by the UE are being provided via an access to the non-3GPP network; or the case that a part of services requested by the UE are being provided via an access to the non-3GPP network.

In an implementation, the processor 141 is configured:

When the network performance parameter is a network load, if it is determined that the network load reaches the preset threshold of network load, to hand over the services requested by the UE being provided via the access to the non-3GPP network from the non-3GPP network to the 3GPP network; or when the network performance parameter is a duration of service unavailable, if it is determined that the duration of service unavailable reaches the preset threshold of duration of service unavailable, to hand over the services requested by the UE being provided via the access to the non-3GPP network from the non-3GPP network to the 3GPP network; or when the network performance parameter is a channel quality index, if it is determined that the channel quality index reaches the preset threshold of channel quality index, to hand over the services requested by the UE being provided via the access to the non-3GPP network from the non-3GPP network to the 3GPP network.

In an implementation, the processor 141 is configured:

To have an access stratum of the UE transmit a handover instruction message to a non-access stratum thereof so that the non-access stratum of the UE informs the network side upon receiving the handover instruction message to modify a routing table of the services requested by the UE being provided via the access to the non-3GPP network and to hand over the services from the non-3GPP network to the 3GPP network.

In an implementation, the processor 141 is configured to hand over all the services requested by the UE from the non-3GPP network to the 3GPP network when all the services are being provided via the access to the non-3GPP network and it is determined that the network performance parameter reaches the preset handover threshold of non-3GPP network performance parameter; and to hand over the part of the services requested by the UE from the non-3GPP network to the 3GPP network when the part of the services are being provided via the access to the non-3GPP network and it is determined that the network performance parameter reaches the preset handover threshold of non-3GPP network performance parameter.

Furthermore the processor 141 is further configured:

If the part of the services requested by the UE being provided via an access to the 3GPP network has been terminated, to have a subsequent service requested by the UE provided via the access to the 3GPP network or the non-3GPP network under an ANDSF policy; or if the part of the services requested by the UE being provided via an access to the 3GPP network has not been terminated, to obtain the network performance parameter corresponding to the non-3GPP network; and when it is determined that the network performance parameter does not reach the preset handover threshold of non-3GPP network performance parameter, to hand over the part of the services requested by the UE from the 3GPP network to the non-3GPP network.

Figure 15:
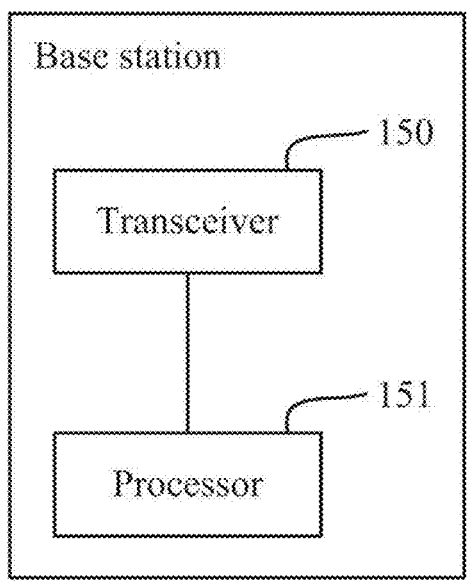
FIG. 15 illustrates a schematic diagram of a base station according to an embodiment of the invention.

The structure of and processing by the base station according to the embodiment of the invention will be described below in connection with a preferred hardware structure. Referring to FIG. 15, the base station includes a transceiver 150, and at least one processor 151 connected with the transceiver 150, where:

The processor 151 is configured to obtain a preset handover threshold of non-3GPP network performance parameter; and The transceiver 150 is configured to transmit the preset handover threshold of non-3GPP network performance parameter to a UE to instruct the UE to be handed over from a non-3GPP network to a 3GPP network when the UE determines that a network performance parameter obtained in the case of the UE residing in the non-3GPP network reaches the preset handover threshold of non-3GPP network performance parameter.

In an implementation, the preset handover threshold of non-3GPP network performance parameter obtained by the processor 151 includes a preset threshold of network load or a preset threshold of duration of service unavailable or a threshold of channel quality index.

In summary, in the embodiments of the invention, a UE obtains a preset handover threshold of non-3GPP network performance parameter, and obtains a network performance parameter in a case of the UE residing in a non-3GPP network; and the UE performs a handover from the non-3GPP network to a 3GPP network upon determining that the network performance parameter reaches the preset handover threshold of non-3GPP network performance parameter. With the technical solutions according to the invention, the detected network performance parameter of the non-3GPP network can be compared with the preset handover threshold of non-3GPP network performance parameter, and a service requested by the UE being provided via the access to the non-3GPP network can be handed over from the non-3GPP network to the 3GPP network according to a result of comparison, to thereby avoid the problem of dropping a call of the UE due to a degraded quality of communication over the non-3GPP network and improve effectively the quality of communication of the UE.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for inter-network handover, comprising:
obtaining, by a User Equipment (UE), a preset handover threshold of non-3GPP network performance parameter;
obtaining a network performance parameter in a case of the UE residing in a non-3GPP network; and
performing, by the UE, a handover from the non-3GPP network to a 3GPP network upon determining that the network performance parameter reaches the preset handover threshold of non-3GPP network performance parameter;
wherein performing, by the UE, the handover from the non-3GPP network to the 3GPP network comprises:
transmitting, by an access stratum of the UE, a handover instruction message to a non-access stratum of the UE, wherein the handover instruction message carries an instruction to perform the handover for the UE from the non-3GPP network to the 3GPP network; and
informing, by the non-access stratum of the UE, a network side upon receiving the handover instruction message to modify a routing table of services requested by the UE being provided via an access to the non-3GPP network and to hand over the services from the non-3GPP network to the 3GPP network.

2. The method according to claim 1, wherein the preset handover threshold of non-3GPP network performance parameter comprises a preset threshold of network load or a preset threshold of duration of service unavailable or a threshold of channel quality index.

3. The method according to claim 2, wherein obtaining, by the UE, the preset handover threshold of non-3GPP network performance parameter comprises:
obtaining, by the UE, the preset handover threshold of non-3GPP network performance parameter transmitted by a base station; or
obtaining, by the UE, the preset handover threshold of non-3GPP network performance parameter in the UE.

4. The method according to claim 1, wherein the case of the UE residing in the non-3GPP network comprises:
a case that all of services requested by the UE are being provided via an access to the non-3GPP network; or
a case that a part of services requested by the UE are being provided via an access to the non-3GPP network.

5. The method according to claim 4, wherein performing by the UE handover from the non-3GPP network to the 3GPP network upon determining that the network performance parameter reaches the preset handover threshold of non-3GPP network performance parameter comprises:
when the network performance parameter is a network load, if the UE determines that the network load reaches a preset threshold of network load, then handing over the services requested by the UE being provided via the access to the non-3GPP network from the non-3GPP network to the 3GPP network; or
when the network performance parameter is a duration of service unavailable, if the UE determines that the duration of service unavailable reaches a preset threshold of duration of service unavailable, then handing over the services requested by the UE being provided via the access to the non-3GPP network from the non-3GPP network to the 3GPP network; or when the network performance parameter is a channel quality index, if the UE determines that the channel quality index reaches a preset threshold of channel quality index, then handing over the services requested by the UE being provided via the access to the non-3GPP network from the non-3GPP network to the 3GPP network.

6. The method according to claim 4, wherein performing by the UE the handover from the non-3GPP network to the 3GPP network upon determining that the network performance parameter reaches the preset handover threshold of non-3GPP network performance parameter comprises:
handing over all the services requested by the UE from the non-3GPP network to the 3GPP network when all the services are being provided via the access to the non-3GPP network and the UE determines that the network performance parameter reaches the preset handover threshold of non-3GPP network performance parameter; and
handing over the part of the services requested by the UE from the non-3GPP network to the 3GPP network when the part of the services are being provided via the access to the non-3GPP network and it is determined that the network performance parameter reaches the preset handover threshold of non-3GPP network performance parameter.

7. The method according to claim 6, wherein after handing over the part of the services requested by the UE from the non-3GPP network to the 3GPP network, the method further comprises:
if a part of services requested by the UE being provided via an access to the 3GPP network has been terminated, then having a corresponding subsequent service requested by the UE provided via an access to the 3GPP network or the non-3GPP network under an Access Network Discovery and Selection Function (ANDSF) policy; or
if the part of the services requested by the UE being provided via the access to the 3GPP network has not been terminated, then obtaining a network performance parameter corresponding to the non-3GPP network; and when it is determined that the network performance parameter corresponding to the non-3GPP network does not reach the preset handover threshold of non-3GPP network performance parameter, handing over the part of the services requested by the UE from the 3GPP network to the non-3GPP network.

8. A method for inter-network handover, comprising:
obtaining a preset handover threshold of non-3GPP network performance parameter; and
transmitting the preset handover threshold of non-3GPP network performance parameter to a UE to instruct the UE to be handed over from a non-3GPP network to a 3GPP network by making an access stratum of the UE transmit a handover instruction message to a non-access stratum thereof so that the non-access stratum of the UE informs a network side upon receiving the handover instruction message to modify a routing table of services requested by the UE being provided via an access to the non-3GPP network and to hand over the services from the non-3GPP network to the 3GPP network when the UE determines that a network performance parameter obtained in a case of the UE residing in the non-3GPP network reaches the preset handover threshold of non-3GPP network performance parameter, wherein the handover instruction message carries an instruction to perform a handover for the UE from the non-3GPP network to the 3GPP network.

9. The method according to claim 8, wherein the preset handover threshold of non-3GPP network performance parameter comprises a preset threshold of network load or a preset threshold of duration of service unavailable or a threshold of channel quality index.

10. A device for inter-network handover, comprising a transceiver, and at least one processor connected with the transceiver, wherein:
the at least one processor is configured to obtain a preset handover threshold of non-3GPP network performance parameter; to obtain a network performance parameter in a case of the device residing in a non-3GPP network; and
to perform a handover from the non-3GPP network to a 3GPP network upon determining that the network performance parameter reaches the preset handover threshold of non-3GPP network performance parameter;
wherein the at least one processor is configured:
to make an access stratum of the device transmit a handover instruction message to a non-access stratum thereof so that the non-access stratum of the device informs a network side upon receiving the handover instruction message to modify a routing table of services requested by the device being provided via an access to the non-3GPP network and to hand over the services from the non-3GPP network to the 3GPP network, wherein the handover instruction message carries an instruction to perform the handover for the device from the non-3GPP network to the 3GPP network.

11. The device according to claim 10, wherein the preset handover threshold of non-3GPP network performance parameter obtained by the at least one processor comprises a preset threshold of network load or a preset threshold of duration of service unavailable or a threshold of channel quality index.

12. The device according to claim 10, wherein the at least one processor is configured:
to obtain the preset handover threshold of non-3GPP network performance parameter transmitted by a base station; or
to obtain the preset handover threshold of non-3GPP network performance parameter in the device.

13. The device according to claim 10, wherein the case of the device residing in the non-3GPP network comprises:
a case that all of services requested by the device are being provided via an access to the non-3GPP network; or
a case that a part of services requested by the device are being provided via an access to the non-3GPP network.

14. The device according to claim 13, wherein the at least one processor is configured:
when the network performance parameter is a network load, if it is determined that the network load reaches a preset threshold of network load, to hand over the services requested by the device being provided via the access to the non-3GPP network from the non-3GPP network to the 3GPP network; or
when the network performance parameter is a duration of service unavailable, if it is determined that the duration of service unavailable reaches a preset threshold of duration of service unavailable, to hand over the services requested by the device being provided via the access to the non-3GPP network from the non-3GPP network to the 3GPP network; or
when the network performance parameter is a channel quality index, if it is determined that the channel quality index reaches a preset threshold of channel quality index, to hand over the services requested by the device being provided via the access to the non-3GPP network from the non-3GPP network to the 3GPP network.

15. The device according to claim 13, wherein the at least one processor is configured:
to hand over all the services requested by the device from the non-3GPP network to the 3GPP network when all the services are being provided via the access to the non-3GPP network and it is determined that the network performance parameter reaches the preset handover threshold of non-3GPP network performance parameter; and
to hand over the part of the services requested by the device from the non-3GPP network to the 3GPP network when the part of the services are being provided via the access to the non-3GPP network and it is determined that the network performance parameter reaches the preset handover threshold of non-3GPP network performance parameter.

16. The device according to claim 15, wherein the at least one processor is further configured:
if a part of services requested by the device being provided via an access to the 3GPP network has been terminated, to have a subsequent service requested by the device provided via an access to the 3GPP network or the non-3GPP network under an Access Network Discovery and Selection Function (ANDSF) policy; or
if the part of the services requested by the device being provided via the access to the 3GPP network has not been terminated, to obtain a network performance parameter corresponding to the non-3GPP network; and when it is determined that the network performance parameter corresponding to the non-3GPP network does not reach the preset handover threshold of non-3GPP network performance parameter, to hand over the part of the services requested by the device from the 3GPP network to the non-3GPP network.

17. A device for inter-network handover, comprising a transceiver, and at least one processor connected with the transceiver, wherein:
the at least one processor is configured to obtain a preset handover threshold of non-3GPP network performance parameter; and
the transceiver is configured to transmit the preset handover threshold of non-3GPP network performance parameter to a UE to instruct the UE to be handed over from a non-3GPP network to a 3GPP network by making an access stratum of the UE transmit a handover instruction message to a non-access stratum thereof so that the non-access stratum of the UE informs a network side upon receiving the handover instruction message to modify a routing table of services requested by the UE being provided via an access to the non-3GPP network and to hand over the services from the non-3GPP network to the 3GPP network when the UE determines that a network performance parameter obtained in a case of the UE residing in the non-3GPP network reaches the preset handover threshold of non-3GPP network performance parameter, wherein the handover instruction message carries an instruction to perform a handover for the UE from the non-3GPP network to the 3GPP network.

18. The device according to claim 17, wherein the preset handover threshold of non-3GPP network performance parameter obtained by the at least one processor comprises a preset threshold of network load or a preset threshold of duration of service unavailable or a threshold of channel quality index.

* * * * *